United States Patent
Bheda et al.

(10) Patent No.: US 8,254,357 B2
(45) Date of Patent: *Aug. 28, 2012

(54) MAINTAINING NETWORK AVAILABILITY FOR WIRELESS CLIENTS IN A WIRELESS LOCAL AREA NETWORK

(75) Inventors: Pradeep J. Bheda, Santa Clara, CA (US); Prasad Y. Chebrolu, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/332,790

(22) Filed: Dec. 21, 2011

(65) Prior Publication Data

US 2012/0120936 A1    May 17, 2012

Related U.S. Application Data

(63) Continuation of application No. 11/608,114, filed on Dec. 7, 2006, now Pat. No. 8,111,674.

(51) Int. Cl.
*H04W 4/00* (2009.01)
*H04W 36/00* (2009.01)
*G06F 15/173* (2006.01)

(52) U.S. Cl. ........ 370/338; 370/331; 709/224; 455/438; 455/437

(58) Field of Classification Search ................. None
See application file for complete search history.

(56) References Cited

U.S. PATENT DOCUMENTS

| | | | |
|---|---|---|---|
| 6,628,933 B1* | 9/2003 | Humes | 455/404.1 |
| 2003/0142648 A1* | 7/2003 | Semper | 370/331 |
| 2005/0096051 A1* | 5/2005 | Lee et al. | 455/438 |
| 2008/0119191 A1* | 5/2008 | Feigen et al. | 455/437 |

* cited by examiner

*Primary Examiner* — Jinsong Hu
*Assistant Examiner* — William Nealon
(74) *Attorney, Agent, or Firm* — Tucker Ellis LLP

(57) ABSTRACT

In an example embodiment, there is described herein a technique that provides network availability to wireless clients (e.g., wireless clients running mission critical applications such as voice applications or medical devices) when a portions of a network is unavailable, such as when performing an image upgrade. One or more access points are switched to a standalone mode of operation, for example an AP that can operate using HREAP (Hybrid Remote Edge Access Point) mode, for maintaining network availability while a portion of the network is unavailable.

17 Claims, 4 Drawing Sheets

MAINTAINING NETWORK AVAILABILITY FOR WIRELESS CLIENTS IN A WIRELESS LOCAL AREA NETWORK

CROSS REFERENCE TO RELATED APPLICATIONS

This application is a continuation of U.S. patent application Ser. No. 11/608,114 filed Dec. 7, 2006 now U.S. Pat. No. 8,111,674.

BACKGROUND

During image upgrades, Access Points (APs), and/or switches for the access points are rebooted after an image download is completed. For example, a LWAPP (Lightweight Access Point Protocol) switch upgrades its image, the switch and its associated access points reboot, causing downtime to the entire network. This causes loss of connectivity for a period of time, which is not acceptable for wireless clients servicing voice applications or mission critical applications such as medical applications.

OVERVIEW OF EXAMPLE EMBODIMENTS

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an example embodiment, there is described herein an apparatus comprising a controller with logic operable to control the operation of a plurality of access points. The controller is configured to select a selected access point to operate in a standalone mode. The controller is further configured to send a signal to an unselected access point of the plurality of access points to direct the unselected access point to signal a wireless client to associate with the selected access point. The controller sends a signal to the unselected access point to switch the unselected access point to an inoperative mode.

In an example embodiment, there is described herein an apparatus comprising a wireless transceiver, a communication interface communicatively coupled to a distribution network and a controller for operatively controlling the wireless transceiver and the communication interface. The controller is responsive to a signal received by the communication interface to initiate an image upgrade to select a wireless client associated with the wireless transceiver to signal the selected wireless client via the wireless transceiver to associate with another access point.

In an example embodiment, there is disclosed herein a method comprising selecting a selected access point from a plurality of access points for operating in standalone mode and directing a selected wireless client to associate with the selected access point. The method further comprises performing an image update to the plurality of access points that are not operating in standalone mode. The method suitably comprises directing the wireless client to associate with one of the plurality of access points that are not in standalone mode after the image update has been performed to the plurality of access points that are not operating in standalone mode. An image update is performed on the selected access point.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated herein and forming a part of the specification, illustrate examples of the present invention, and together with the description serve to explain the principles of the invention.

DESCRIPTION OF EXAMPLE EMBODIMENTS

Figure 1:
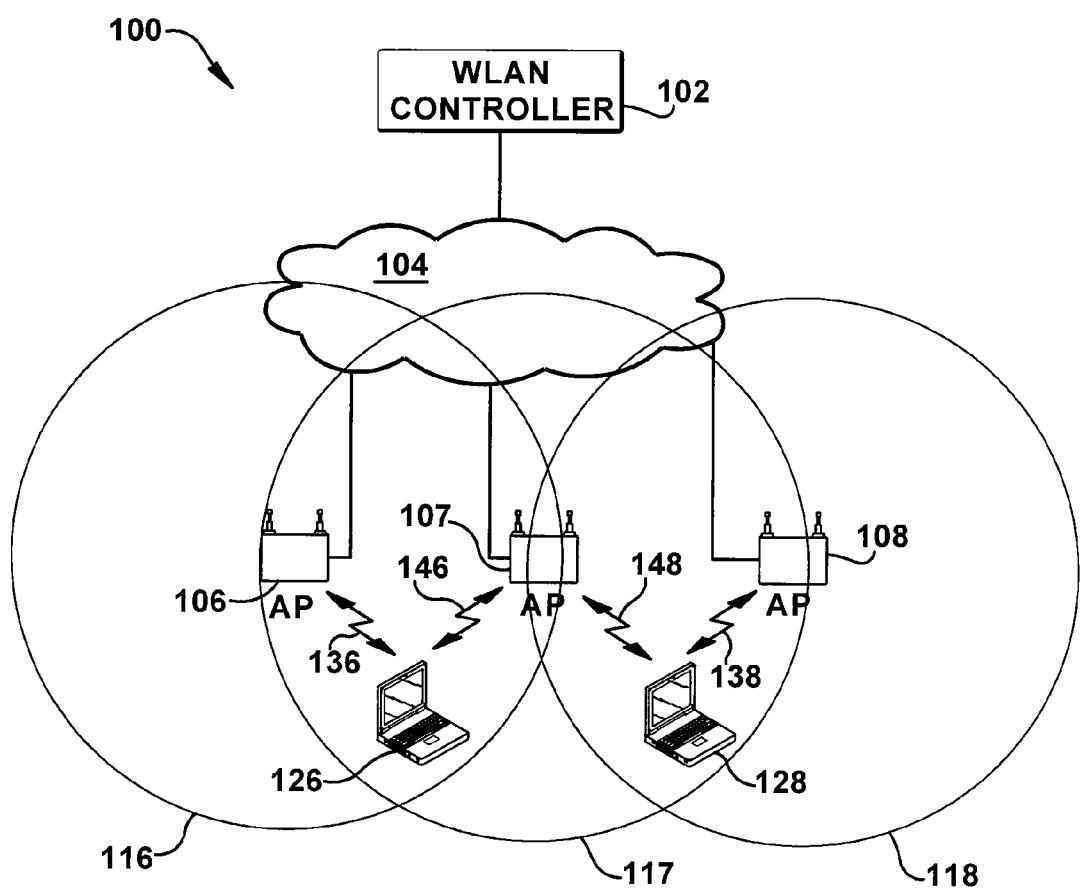
FIG. 1 illustrates an example embodiment of a network with a single controller configured for maintaining availability for wireless clients.

This description provides examples not intended to limit the scope of the invention, as claimed. The figures generally indicate the features of the examples, where it is understood and appreciated that like reference numerals are used to refer to like elements.

In an example embodiment, there is described herein a technique that provides network availability to wireless clients (e.g., wireless clients running mission critical applications such as voice applications or medical devices) when portions of a network are unavailable, such as when performing an image upgrade. One or more access points are switched to a standalone mode of operation, for example an AP that can operate using HREAP (Hybrid Remote Edge Access Point) mode, for maintaining network availability.

The controller can be aware of mission critical and voice clients based on WMM/CAC usage and/or a special IE can be employed for identifying mission critical devices, such as medical devices. The controller directs the mission critical and voice clients to roam (associate) with any access points operating in standalone mode.

In an example, embodiment, after the unavailable portion of the network again becomes available (e.g., the access points or other controllers have completed their image updates and rebooted), the controller directs the wireless access points associated with the standalone access points to move the wireless clients to other access points so that the standalone access points can be upgraded. Once the mission critical and voice wireless clients have moved off the standalone access points, the access points can perform the image upgrade, reboot and resume operation on a non-standalone mode.

In an example embodiment, the controller can perform an image update while the standalone access points maintain network availability to the mission critical and voice clients. Once the controller has completed the upgrade, the access points can return to a non-standalone mode. Optionally, after the controller has performed the upgrade, the controller can direct select one or more access points to remain in operation while another group of access points performs the upgrade and reboot. After the upgraded access points reconnect to the controller, the selected one or more access points can then be upgraded.

In an example embodiment, where multiple controllers are employed, each controller having an associated plurality of access points, a controller and its associated access points can remain in service while other controllers and their associated access points switch to an inoperable mode. For example, while performing an image upgrade, a second set of controllers and its associated access points remain operational while a first set of controllers and their associated access points perform the upgrade. The first set of controllers direct mission critical wireless clients and voice clients to associate with access points associated with the second set of controllers. After the mission critical wireless clients and voice clients have roamed (associated) to access points belonging to the second set of access points, the first set of controllers and/or their associated access points download the image, reboot and return to an operational mode. After the first set of clients return to an operational mode, the second set of controllers direct their associated access points to move the mission critical and voice clients to access points associated with the first set of controllers. After the wireless client have roamed (associated) to the first set of controllers, the second set of controllers and/or their associated access points download the image for upgrade, reboot and return to an operational mode.

FIG. 1 illustrates an example embodiment of a network 100 with a single WLAN controller 102 configured for maintaining availability for wireless clients. Controller 102 is communicatively coupled by a distribution network 104 (e.g., a wired network such as an Ethernet or IP Network or a wireless network such as a mesh network or a combination or wired and wireless networks) to access points 106, 107, 108. Access points 106, 107, 108 have an associated coverage area, 116, 117, 118 respectively. Controller 102 comprises logic operable to control the operation of access points 106, 107, 108. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

When WLAN controller 102 decides to switch a first set of access points to a non-operational mode (e.g., to perform an image upgrade), switch controller 102 selects a second set of access points to remain in a stand alone operational mode. As used herein, a non-operational mode is a mode wherein an access point is unable to provide service for a wireless client during the duration of image upgrade and a stand alone operational mode is a mode wherein the access point can provide service to a wireless client in the absence of the controller. For example, WLAN controller 102 can decide to switch access points 106, 108 into a non-operational mode to perform an upgrade and select access point 107 to remain in operational mode. When the WLAN controller 102 is upgrading, WLAN controller 102 can signal access point 107 to switch to a standalone mode, enabling access point 107 to continue operating while WLAN controller 102 and/or access points 106, 108 are non-operational.

WLAN controller 102 determines a wireless client (or a set of wireless clients) for maintaining network availability while WLAN controller 102 and access points 106, 108 are non-operational. WLAN controller 102 can determine mission critical or voice clients based on any defined criteria, such as WMM/CAC usage or by determining from an IE associated with a wireless client that the wireless client is a mission critical wireless client (for example a medical device or an emergency communication device). Alternatively, WLAN controller 102 can select all wireless clients.

WLAN controller 102 directs access points 106, 108 to signal the wireless clients and/or voice clients (e.g., wireless clients 126, 128) to associate with access point 107. For example, as illustrated in FIG. 1, wireless client 126 is initially associated with access point 106 as illustrated by arrow 136 and wireless client 128 is initially associated with access point 108 as illustrated by arrow 138. If WLAN controller 102 determines that wireless clients 126, 128 are mission critical and/or voice clients, it can direct them to associate with access point 107 as illustrated by arrows 146, 148 respectively. After wireless clients 126, 128 have moved from access points 106, 108 respectively, WLAN controller 102 can switch itself to non-operational mode for an upgrade and then switch access points 106, 108 to a non-operational mode.

After access points 106, 108 have switched to a non-operational mode, an image upgrade or other maintenance can be performed on them. While the image upgrade or other maintenance is being performed, access point 107 maintains connectivity between distribution network 104 and wireless clients 126, 128. WLAN controller 102 can signal access points 106, 108 to reboot (restart) after image upgrade or other maintenance is performed. Alternatively, access points 106, 108 can automatically reboot, if desired, when ready to return to service.

As WLAN controller 102 and/or access points 106, 108 return to an operational mode, WLAN controller 102 can signal wireless access point 107 to direct wireless clients 106, 108 to associate with either access point 106 or access point 108. WLAN controller 102 can signal access point 107 to switch to a non-operational mode or reboot for upgrading to the new image that now exists on the switch/controller 102. WLAN controller 102 switches access point 107 to non-operational mode after wireless clients 126, 128 have associated with other access points (e.g., access points 106, 108). Access point 107 can then perform an image upgrade, or other maintenance, and return to an operational mode when completed. In an example embodiment, access point 107 returns to an operational mode after a reboot (restart).

In an example embodiment, WLAN controller 102 is configured to determine the location of wireless clients (e.g., wireless clients 126, 128) for maintaining network availability. WLAN controller 102 selects an access point (e.g., AP 107) for the wireless clients (e.g., wireless clients 126, 128) based on the proximity of the selected access point to the location of the wireless clients. In the example illustrated in FIG. 1, wireless clients 126, 128 are both within coverage area 117 for access point 107. Thus, WLAN controller 102 can select access point 107 to remain in operation (e.g., in a standalone mode) while WLAN controller 102 and/or access points 106, 108 are in a non-operational mode. WLAN controller 102 signals access points 106, 108 to signal wireless clients 126, 128 respectively to associate with access point 107. After WLAN controller 102 and/or access points 106, 108 return to an operational mode, WLAN controller 102 can signal access point 107 to have wireless clients 126, 128 to associate with one of access points 106, 108. After wireless clients 126, 128 are no longer associated with access point 107 WLAN controller 102 can switch access point 107 to a non-operational mode.

Figure 2:
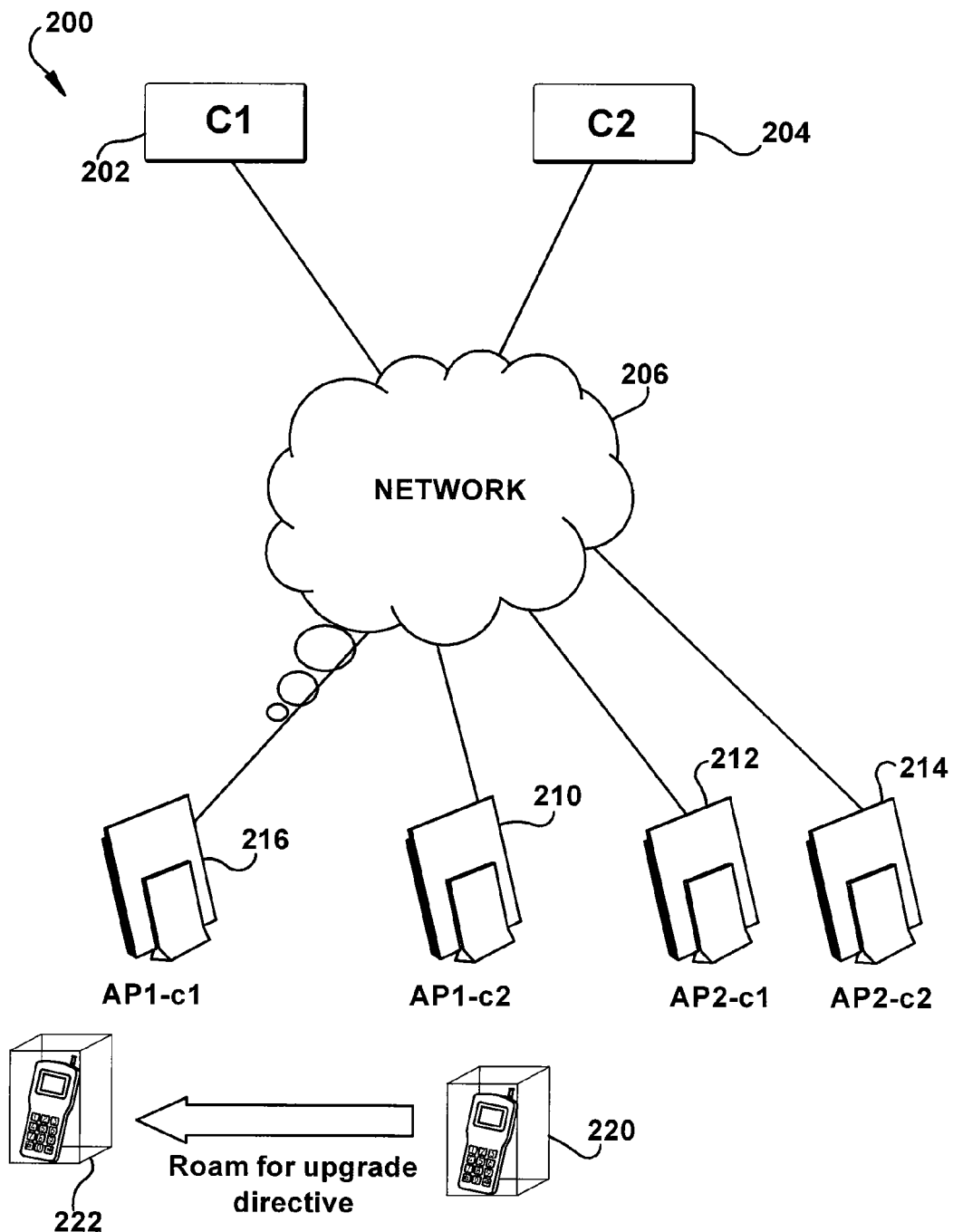
FIG. 2 is illustrates an example embodiment of a network with a multiple controllers configured for maintaining availability for wireless clients.

FIG. 2 is illustrates an example embodiment of a network 200 with a multiple controllers configured for maintaining availability for wireless clients. In this embodiment, there are illustrated two WLAN controllers 202, 204 coupled to distribution network 206. Access points 212, 216 are coupled to WLAN controller 202. Access points 210, 214 are coupled to WLAN controller 204. A wireless client is initially associated with access point 210 at 220, and subsequently roams to at 222 to access point 216 pursuant to a signal from access point 210. In this example embodiment the wireless client moves from access point 210 on WLAN controller 204 to access point 216 on WLAN controller 202.

In an example embodiment, WLAN controllers 202, 204 and their associated access points switch to a non-operational mode at different times to maintain network availability. For example, WLAN controller 204 and access points 210 and 214 associated with controller 204 can switch to a non-operational mode (e.g., to perform an image update) while WLAN controller 202 and access point 216 and 212 associated with WLAN controller 202 remain in an operational mode. Before switching to a non-operational mode, WLAN controller 204 sends a signal through distribution network 206 to access point 210 to have a wireless client associated with access point 210, illustrated at 220, to roam (associate) with access point 216, illustrated at 222. After the wireless client has roamed, WLAN controller 204 and access points 210 and 214 switch to a non-operational mode (e.g., perform an image upgrade). When WLAN controller 204 and one or more of access points 210, 214 return to an operational mode (e.g., after performing a reboot after an image upgrade), WLAN controller 202 can signal access point 216 to have wireless client associate with one of the access points 210, 214 associated with WLAN controller 204. After the client has roamed to an access point associated with WLAN controller 204, WLAN controller 202 and access point associated with WLAN controller 202 (which are access points 212 and 216) switch to a non-operational mode.

In an example embodiment, if WLAN controllers 202, 204 need to switch to a non-operational state (for example some maintenance is needed), access points 210, 212, 214, 216 can all be signaled to switch to a standalone operation mode (e.g., they will operate without receiving any control functions from their controller). Once access points 210, 212, 214, 216 have switched to a standalone mode, WLAN controllers 202, 204 can switch to a non-operational mode. After WLAN controllers 202, 204 have returned to an operational mode, access points 210, 212, 214, 216 can again be associated with their respective WLAN controllers 202, 204.

In an example embodiment, WLAN controllers 202, 204 can switch selected access points to a standalone mode (e.g., APs 216, 212), while WLAN controllers 202, 204 and/or unselected access points (e.g., APs 210, 214) switch to a non-operational mode. In an example embodiment, any mission critical, voice clients and/or all wireless clients associated with the unselected access points can be signaled to switch to one of the selected access points. After WLAN controllers 202, 204 and the APs (e.g., 210, 214) that were switched to a non-operational mode return to an operational mode (e.g., after completing an image upgrade and rebooting), wireless clients (either mission critical wireless clients, voice wireless clients and/or all wireless clients) associated with the selected access points can be directed to roam (associate) with the unselected access points. After the wireless clients roam to the unselected access points, the selected points can then be switched to a non-operational mode.

Figure 3:
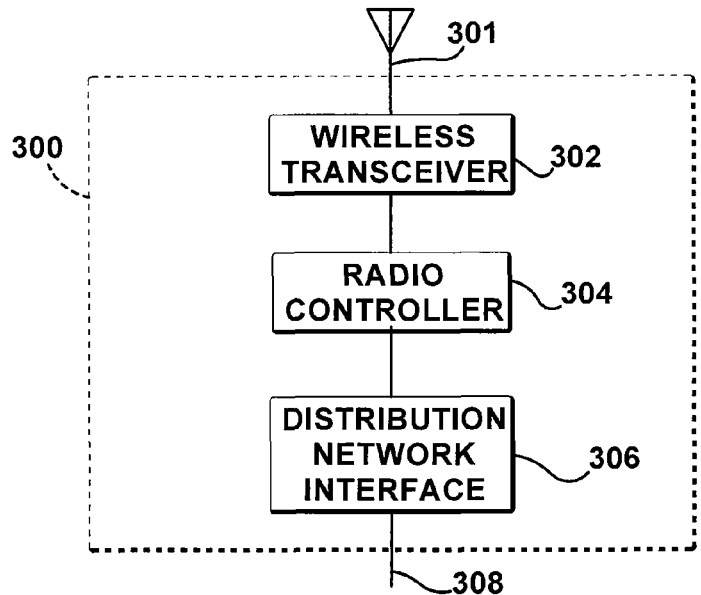
FIG. 3 illustrates an example embodiment of an access point configured for maintaining availability for wireless clients.

FIG. 3 illustrates an example embodiment of an access point 300 configured for maintaining availability for wireless clients. Access point 300 is suitable to implement the functionality described for access points 106, 107, 108 (FIG. 1) and/or access points 210, 212, 214, 216 (FIG. 2). AP 300 comprises a wireless transceiver 302 operable for wireless communication. Wireless transceiver 302 may suitably comprise an antenna 301 for transmitting and receiving wireless signals. Wireless transceiver 302 can have circuits for amplification, modulation/demodulation, frequency conversion, digital to analog (D/A), analog to digital (ND), etc.

Radio controller 304 is coupled to wireless transceiver 302. Radio controller 304 is operative to control the operation of wireless transceiver 302. Radio controller 304 comprises logic for performing the functionality described herein. Radio controller 304 is configured to acquire data from wireless signals received by wireless transceiver 302. Radio controller 304 is also configured to send data to wireless transceiver 302 for wireless transmission.

Distribution network interface 306 is coupled to radio controller 304 and is employed to couple AP 300 to a distribution network. Radio controller 304 is operative to controls the operation of distribution network interface 206, e.g., distribution network 104 (FIG. 1) or 206 (FIG. 2). For example, referring to AP 107 in FIG. 1, wireless transceiver 302 is employed for wirelessly communicating with wireless (mobile) clients, such as clients 126, 128 and distribution network interface 306 is coupled to network 304 via a coupler 308. If AP 300 is coupled to the distribution network via a wired connection (e.g., Ethernet), then coupler 308 could be a wired connection such as an Ethernet cable. If AP 300 is coupled wirelessly to the distribution network (e.g., the distribution network is a Mesh network), then coupler 308 can be an antenna suitably adapted for sending and receiving wireless signals.

In an example embodiment, radio controller 304 is responsive to a signal received by communication interface 308 to initiate an image upgrade to select a wireless client (not shown) associated with wireless transceiver 302 to signal the selected wireless client via wireless transceiver 302 to associate with another access point.

In an example embodiment, radio controller 304 selects the wireless client based on a wireless multimedia extension associated with the wireless client. In an example embodiment, radio controller 304 selects the wireless client based on a call admission control associated with the wireless client. In an example embodiment, radio controller 304 selects the wireless client based on an information element associated with the wireless client. The information element can be configured to identify the wireless client as a high priority client such as a medical device or emergency service device.

In another example embodiment, radio controller 304 selects all wireless clients associated with wireless transceiver 302.

Figure 4:
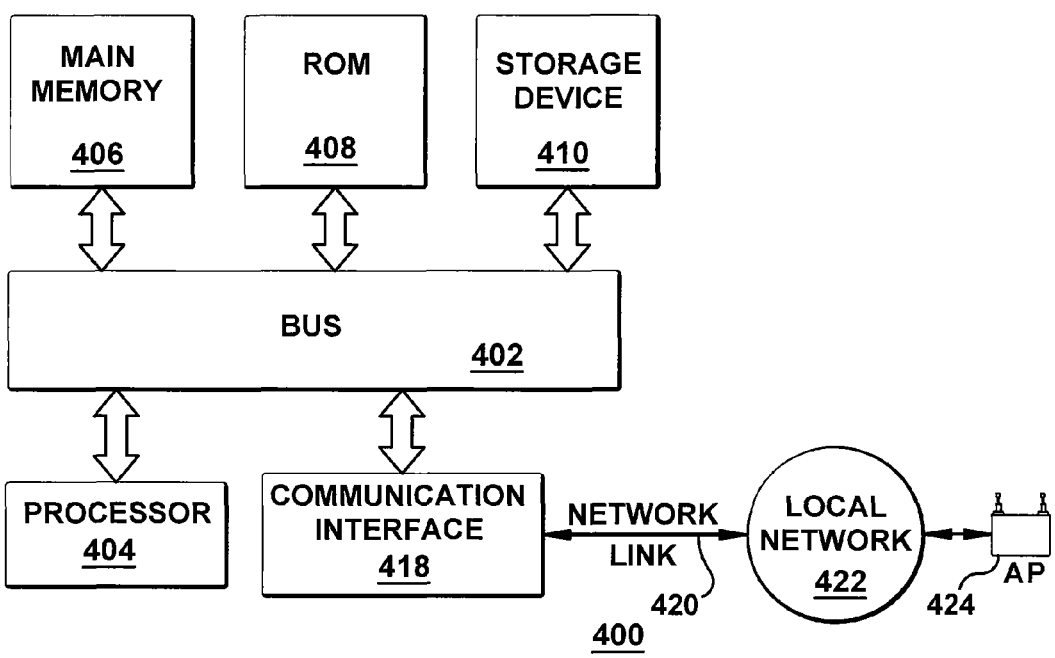
FIG. 4 illustrates an example of a computer system for implementing an example embodiment.

FIG. 4 illustrates an example of a computer system 400 for implementing an example embodiment. Computer system 400 can suitably be employed for implementing the functionality of WLAN controller 102 and/or access points 106, 107, 108 (FIG. 1); WLAN controllers 202, 204 and/or access points 210, 212, 214, 216 (FIG. 2); and/or radio controller 304 (FIG. 3). Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

An aspect of an example embodiment is related to the use of computer system 400 for maintaining high network availability for wireless clients in a wireless local area network (WLAN). According to one embodiment of the invention, maintaining high network availability for wireless clients in a WLAN) is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Computer system 400 also includes a communication interface 418 coupled to bus 402. Communication interface 418 provides a two-way data communication coupling to a network link 420 that is connected to a distribution network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. Computer system 400 can send messages and receive data, including program codes, through associated network(s), network link 420, and communication interface 418.

Figure 5:
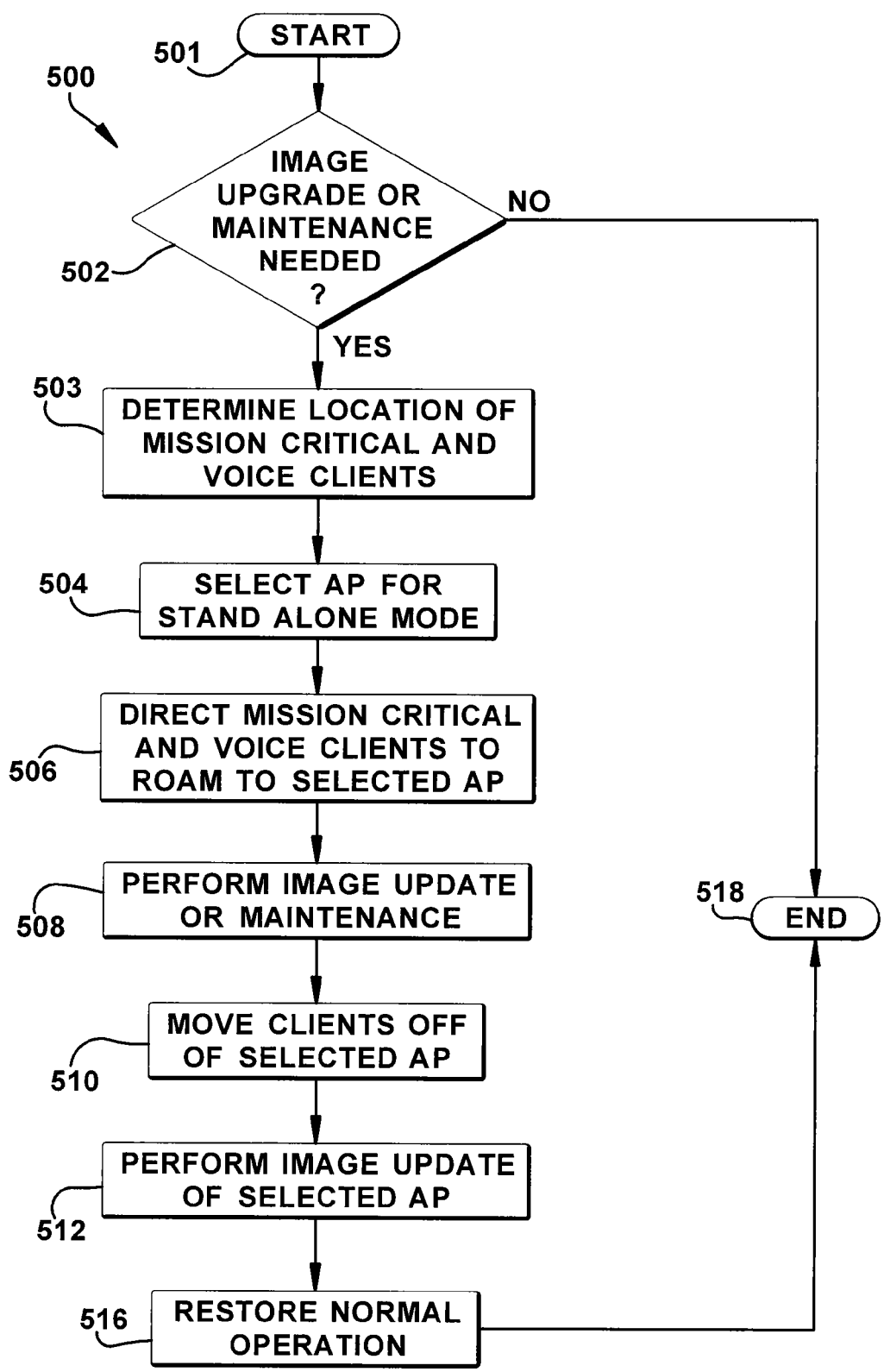
FIG. 5 illustrates an example methodology for providing high availability for wireless clients.

In view of the foregoing structural and functional features described above, a methodology 500 in accordance with various aspects of the present invention will be better appreciated with reference to FIG. 5. While, for purposes of simplicity of explanation, the methodology 500 of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement methodology 500 in accordance with an aspect the present invention. Embodiments of the present invention are suitably adapted to implement methodology 500 in hardware, software, or a combination thereof.

Starting the description of methodology at 500 at 501, at 502 a determination is made as to whether an image upgrade or maintenance is needed for a network device (e.g., a WLAN controller and/or AP). If an image upgrade is not needed, or no maintenance is needed (NO), then methodology stops at 518. However, if at 502 it is determined that an image upgrade or maintenance is needed (YES), at 503, the location of one or more mission critical wireless clients and/or wireless voice clients is determined. Mission critical clients can be identified by associated WMM usage or IE associated with the wireless client. For example an IE can identify a client as a medical device, security device or an emergency communication device. Voice clients can be identified by CAC usage. In an alternative example embodiment, the location of all wireless clients can be determined. Any technique can be used for determining the location of the wireless clients such as Received Signal Strength Intensity (RSSI), Angle of Arrival (AOA), or Global Positioning Service (GPS).

At 504, one or more access points are selected to operate in a standalone mode, such as HREAP. In an example embodiment, the access points are selected based on proximity to the mission critical and/or voice wireless clients to ensure service to these clients.

At 506, the mission critical and/or voice wireless clients are directed to roam (associate) to one of the selected access points. A signal can be sent to the access point where the mission critical and/or voice clients are currently associated to direct them to roam (associate) to a selected access point. Optionally, the message directing the mission critical and/or voice client to roam can specify which access point to roam.

At 508, an image update (or other maintenance) is performed on the unselected access points. In an example embodiment, the unselected access points switch to a non-operational mode (e.g., they stop servicing wireless clients), download the new image, install the new image, and then restart (reboot). After the restart, the unselected access points are again in an operational mode (e.g., they are now capable of servicing wireless clients).

At 510, the wireless clients (either the mission critical, voice and/or all wireless clients) are moved off the selected access points. A signal can be sent to the wireless clients providing a list of access points, or specifying an access point, available for servicing the wireless client.

At 512, the selected access points perform the image upgrade. The selected access points can verify that all mission critical, voice, and/or all wireless clients have roamed to another access point before initiating the image upgrade. In an example embodiment, the image upgrade includes switching to a non-operational mode, downloading and installing the new image, and restarting (rebooting). After rebooting, all of the access points will have been upgraded, while maintaining network availability. At 516 normal operation is restored and at 518 the process is completed.

In the aforementioned descriptions, the example embodiments performed two image upgrades, first the unselected access points and/or controllers and/or then the selected access points and/or controllers. However, those skilled in the art can readily appreciate that any size grouping can be selected for performing network maintenance and/or image upgrades and the algorithm can be repeated as often as desired to upgrade the entire network. For example, for a very busy network, maybe only twenty percent of the access points can be down at any one time in order to maintained sufficient network connectivity to the mission critical and/or voice clients. In this example the algorithm can be repeated five times, (e.g., twenty percent of the access points are removed from service at any one time, thus five iterations would be performed to upgrade all access points.

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a controller with logic operable to control the operation of a plurality of access points communicating with a plurality of mobile wireless clients in a network;
wherein the controller is configured to determine a set of mobile wireless clients selected from the plurality of wireless clients for maintaining network availability, the set of mobile wireless clients selected from one of a group consisting of mission critical wireless clients and wireless voice clients;
wherein the controller is configured to determine a location of a member of the set of mobile wireless clients for maintaining network availability;
wherein the controller is configured to select a selected access point to operate in a standalone mode, the selected access point is selected in accordance with a proximity of the selected access point to the location of the member of the set of mobile wireless clients for maintaining network availability;
wherein the controller is configured to send a first signal to the selected access point directing the selected access point to operate in the standalone mode;
wherein the selected access point is responsive to the first signal to operate in the standalone mode;
wherein the controller is configured to send a second signal to an unselected access point of the plurality of access points to direct the unselected access point to communicate a message to the set of wireless clients for maintaining network availability, the message comprising data directing the set of wireless clients to associate with the selected access point operating in the standalone mode; and
wherein the controller is configured to send a third signal to the unselected access point to switch the unselected access point to a non-operational mode.

2. An apparatus according to claim 1, further comprising the controller is configured to signal the unselected access point to perform an image upgrade while the unselected access point is in the non-operational mode.

3. An apparatus according to claim 1, further comprising the controller is configured to signal the unselected access point to perform a restart while the unselected access point is in the non-operational mode.

4. An apparatus according to claim 1, further comprising:
the controller is responsive to detecting that at least one unselected access point of the plurality of access points has returned to an operational mode to signal the selected access point to signal the set of mobile wireless clients to associate with one of the at least one unselected access point; and
the controller is responsive to detecting that at least one unselected access point of the plurality of access points has returned to an operational mode to signal the selected access point to switch to the non-operational mode.

5. An apparatus according to claim 1, wherein the controller is configured to select the set of mobile wireless clients for maintaining network availability based on a wireless multimedia extension associated with the set of mobile wireless clients.

6. An apparatus according to claim 1, wherein the controller is configured to select the set of mobile wireless clients for maintaining network availability based on a call admission control associated with the set of mobile wireless clients.

7. An apparatus according to claim 1, wherein the controller is configured to select the set of mobile wireless clients for maintaining network availability based on an information element associated with the set of mobile wireless clients.

8. An apparatus according to claim 7, wherein the information element identifies at least one mobile wireless client of the set of mobile wireless clients as a medical device.

9. An apparatus according to claim 1, further comprising:
a second controller, wherein the selected access point is associated with the second controller; and
wherein the second controller and the selected access point remain in an operational mode while the unselected access point is in the non-operational mode.

10. An apparatus according to claim 9, further comprising:
the second controller is responsive to determining at least one unselected access point of the plurality of access points has returned to an operational mode to signal the selected access point to signal the set of mobile wireless clients to associate with a one of the at least one unselected access point that has returned to an operation mode; and
the second controller is responsive to signal the selected access point to switch to the non-operational mode.

11. An apparatus according to claim 10, wherein the unselected access point is configured to perform an image upgrade and initiate a reboot while in the non-operational mode, and the second controller and selected access point are configured to perform an image upgrade and initiate a reboot after switching to the non-operational mode.

12. An apparatus, comprising:
a wireless transceiver for communicating with a plurality of mobile wireless clients;
a communication interface communicatively coupled with an associated distribution network; and
a controller for operatively controlling the wireless transceiver and the communication interface;
wherein the controller determines a set of mobile wireless clients selected from the plurality of wireless clients for maintaining network availability, the set of mobile wireless clients selected from one of a group consisting of mission critical wireless clients and wireless voice clients;

wherein the controller is configured to determine a location of a member of the set of wireless client for maintaining network availability;

wherein the controller is responsive to a signal identifying a selected access point for receiving an image update to determine a second access point that is within a proximity to the location of the member of the set of wireless clients for maintaining network availability associated with the selected access point, to send a message to the member of the set of wireless clients for maintaining network availability associated with the selected access point to roam to the second access point.

13. An apparatus according to claim 12, wherein the controller selects a mobile wireless client for maintaining network availability based on a wireless multimedia extension associated with the mobile wireless client.

14. An apparatus according to claim 12, wherein the controller selects a mobile wireless client for maintaining network availability based on a call admission control associated with the mobile wireless client.

15. An apparatus according to claim 12, wherein the controller selects a mobile wireless client for maintaining network availability based on an information element associated with the mobile wireless client.

16. An apparatus according to claim 15, wherein the information element identifies the mobile wireless client for maintaining network availability as a medical device.

17. A method, comprising:
determining a set of mobile wireless clients selected, from the plurality of mobile wireless clients for maintaining network availability, the set of mobile wireless clients for maintaining network availability selected from a group consisting of mission critical wireless clients and wireless voice clients;

determining a location of a selected member of the set of mobile wireless clients for maintaining network availability;

selecting a specified access point from a plurality of access points for operating in standalone mode in accordance with a proximity of the specified access point to the location of the selected member of the set of mobile wireless clients for maintaining network availability;

communicating, to the selected member of the set of mobile wireless clients for maintaining network availability a message comprising data representative of the specified access point, the data representative of the specified access point directing the selected member of the set of mobile wireless clients for maintaining network availability to associate with the specified access point;

performing an image update an unselected access point belonging to the plurality of access points that is not operating in the standalone mode;

directing the member of the set of mobile wireless clients for maintaining network availability to associate with the unselected access point after the image update has been performed to the unselected access points; and performing an image update to the specified access point after directing the member of the set of mobile wireless clients for maintaining network availability to associate with the unselected access point.

* * * * *